Patented Oct. 18, 1927.

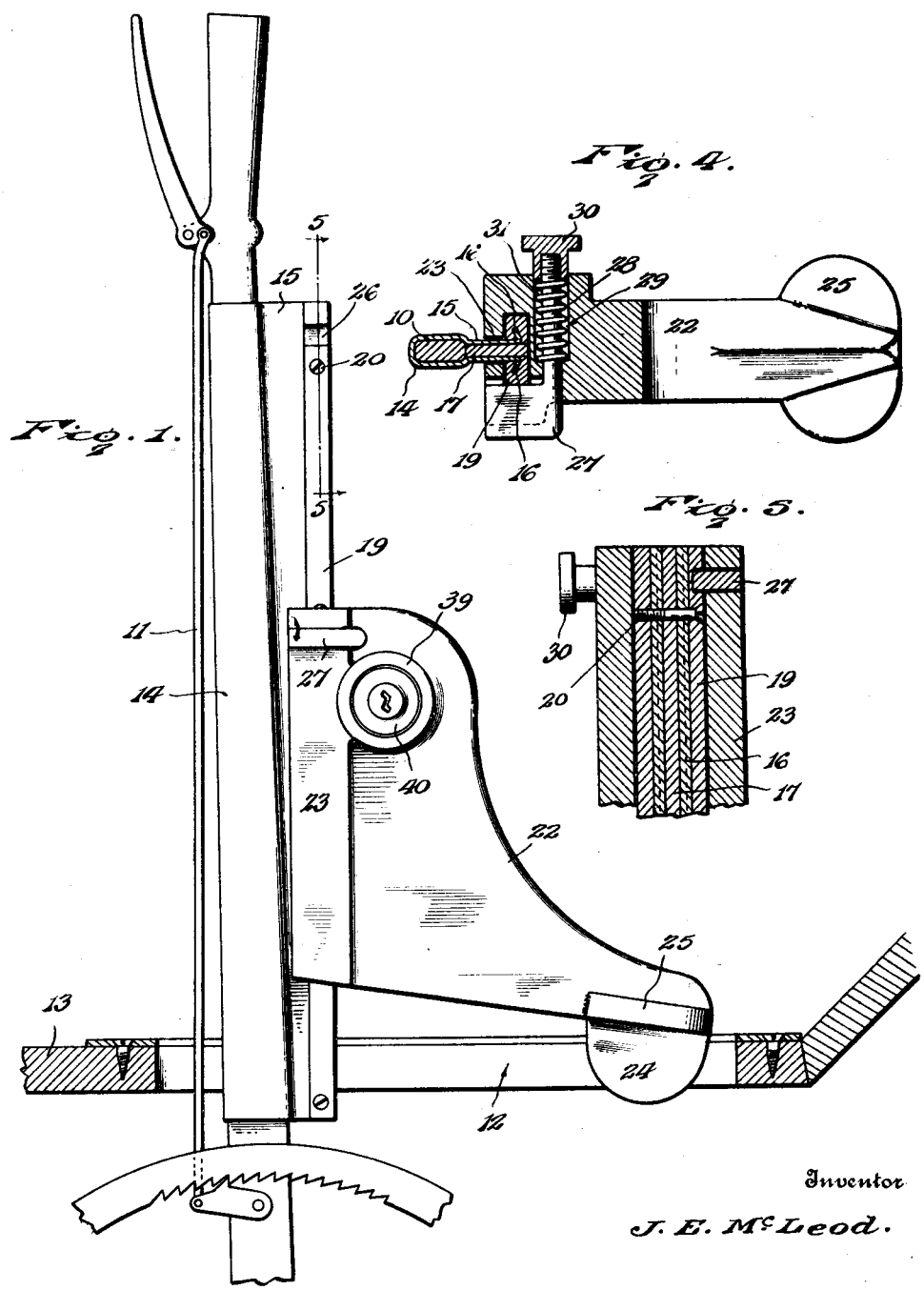

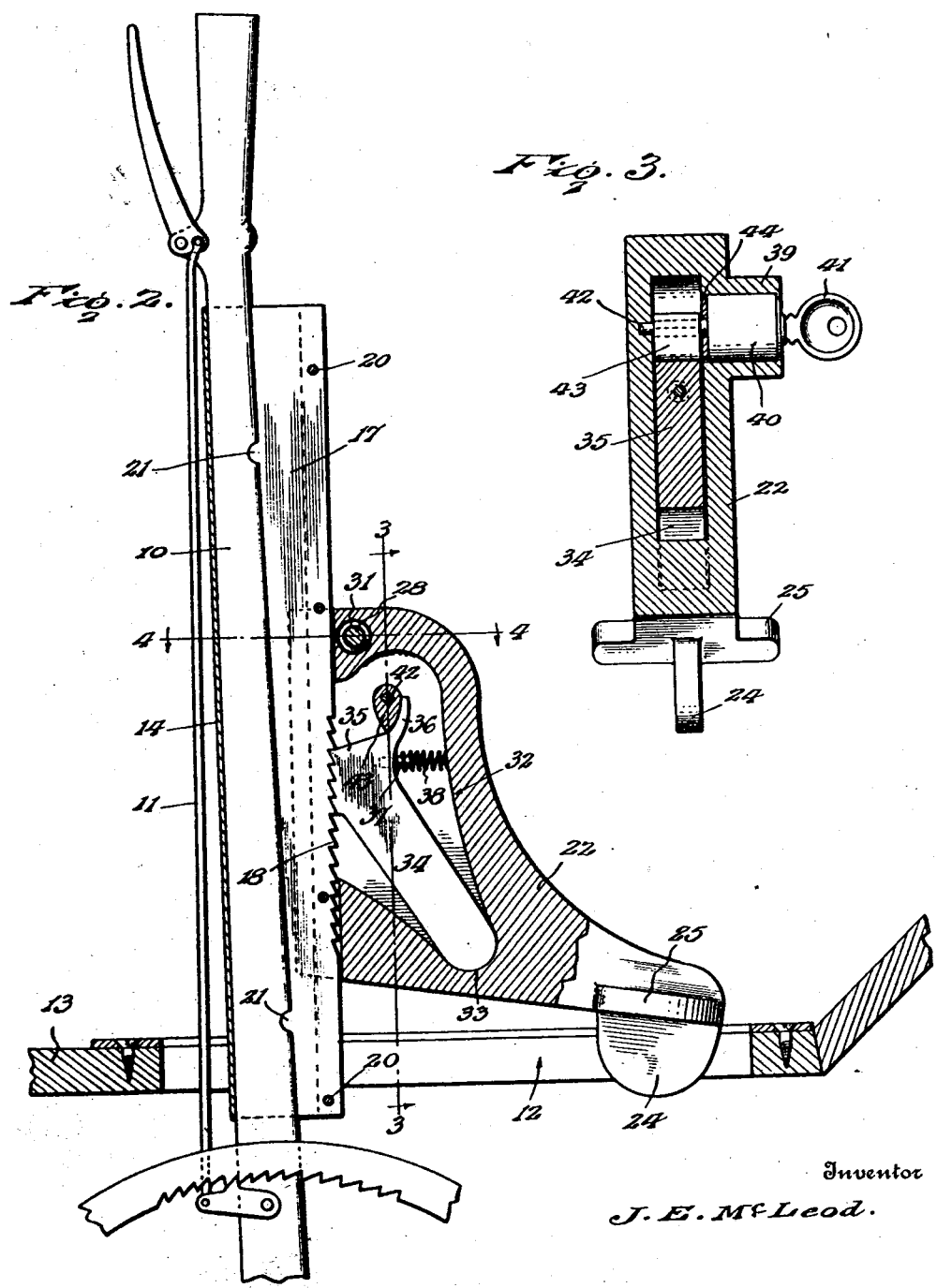

1,645,914

UNITED STATES PATENT OFFICE.

JOHN EARL McLEOD, OF WASHINGTON, KANSAS.

LOCKING DEVICE FOR MOTOR VEHICLES.

Application filed May 19, 1926. Serial No. 110,199.

This invention relates to an improved locking device and while being, with slight structural variations, well adapted for various uses, is, nevertheless, particularly designed for locking motor vehicles so as to prevent the theft or unauthorized operation thereof.

The invention seeks, among other objects, to provide a device which may be installed upon one of the levers of a motor vehicle such, for instance, as the brake lever, and operated, when the brakes are applied, for locking the lever against movement to release the brakes and consequently locking the vehicle against movement.

A further object of the invention is to provide a device embodying a locking member slidably mounted upon the lever and which, when released, will gravitate to active position for locking the lever against movement, while a pawl and rack will be provided in conjunction with said member for automatically locking the member against retraction.

Another object of the invention is to provide a lock-operated cam for releasing the pawl and wherein means will be provided for normally securing the locking member in elevated inactive position on the lever.

And the invention seeks, as a still further object, to provide a device which may be readily installed and which will be well adapted for general use upon motor vehicles as now on the market.

Other objects of the invention not specifically mentioned in the foregoing will appear during the course of the following description.

In the accompanying drawings:

Figure 1 is a side elevation showing my improved locking device applied to the emergency brake lever of the well known Ford automobile.

Figure 2 is a view similar to Figure 1, but showing the locking member and other parts in section.

Figure 3 is a transverse sectional view on the line 3—3 of Figure 2, looking in the direction indicated by the arrows.

Figure 4 is a horizontal sectional view on the line 4—4 of Figure 2, looking in the direction indicated by the arrows.

Figure 5 is a fragmentary vertical sectional view on the line 5—5 of Figure 1, looking in the direction indicated by the arrows.

Referring now more particularly to the drawings, I have shown the emergency brake lever of a Ford automobile at 10, the lever being provided with a latch indicated as a whole at 11 and, as illustrated, the lever is freely received through a suitable slot 12 in the floor boards 13 of the vehicle. As is well known, the lever 10 is movable rearwardly, or to the left as seen in Figures 1 and 2 of the drawings, for applying the emergency brakes of the vehicle while suitable means are provided in conjunction with the lever whereby, as the lever is shifted rearwardly, the high speed clutch of the vehicle transmission is moved to inactive position so that when the emergency brakes are applied, the high speed clutch is held inactive by the lever.

In accordance with the present invention, I employ a preferably sheet metal sleeve 14 which, as seen in Figure 4, is shaped to embrace the lever and is provided with spaced parallel wings 15 gradually widened toward the upper end of the lever, the wings being formed at their free edges with lateral flanges 16. As shown, the sleeve 14 extends throughout the major portion of the length of the lever, and disposed between the wings 15 is a rack bar 17 provided at its forward edge with rack teeth 18 located near the lower end of the bar. Overlying the wings 15 are rails 19 which are grooved to accommodate the flanges 16, and extending through the rails at spaced points, through said wings, and through the rack bar 17, are screws or other fastening devices 20 rigidly clamping the parts together and securing the sleeve on the lever, the heads of the screws being countersunk in said rails. Since the wings 15 of the sleeve are widened toward their upper ends, the rack bar 17 is, as shown in Figure 2, also widened toward its upper end to rest, at its inner edge, flat against the forward edge of the lever 10, and formed on said bar to engage in suitable notches provided in the lever are lugs 21 locking the bar and sleeve against longitudinal movement on the lever.

Slidable on the rails 19 is an angle shaped locking member 22 which, as seen in Figure 4, is provided at its rear vertical edge with companion flanges 23 to embrace said rails, and formed on the base edge of said member at its free end is a depending ear 24 adapted to extend through the slot 12 of the floor boards 13 while, at opposite sides of said ear, the locking member is further provided with lateral ears 25 disposed to overlie the floor boards at opposite sides of said slot. Formed in one of the rails 19 near its upper end, as seen in Figure 1, is a notch 26, and slidable through the upper end of the locking member forwardly of the flanges 23 is a transversely disposed substantially L-shaped latch 27, the head of which is, as seen in Figure 4, freely received in a suitable slot in the adjacent one of said flanges. The stem 28 of the latch extends through a recess 29 in the locking member, and screwed on the outer end of said stem is a knob 30 slidably fitting in the outer end of said recess while a spring 31 is disposed within the recess to act against said knob for holding the head of the latch in engagement with the underlying one of the rails 19. Accordingly, as the locking member is shifted upwardly on the rails 19, the head of the latch will drop into the notch 26 for securing the locking member in elevated inactive position. It is now to be observed that by widening the wings 15 of the sleeve 14 at their upper ends and correspondingly widening the rack bar 17, the rails 19 are disposed in angular relation with respect to the lever 10 so that the locking member, when lifted upwardly on the rails, will clear the forwardly tilted handle at the upper end of the lever. Accordingly, the locking member may, as will be perceived, be removed at the upper ends of the rails so that the floor boards 13 may, in turn, when desired, be lifted upwardly over the lever and removed to permit access to the parts of the vehicle immediately beneath the floor boards.

Formed in the locking member 22 medially thereof is a recess 32, the mouth of which lies between the flanges 23 of said member while the lower end of said recess is restricted to form a rounded socket 33. Mounted to rock within said recess is a pawl 34 which freely fits between the side walls of said recess and is rounded at its lower end to fit in the socket 33. At its upper end the pawl is provided with a head 35 having rack teeth to coact with the rack teeth 18, and rising from the inner end of said head is a lug 36. Below said lug, the head carries a pin 37, and frictionally engaging over said pin is a spring 38 pressing the pawl outwardly to coact with the rack bar. Near the upper end of the recess 32, one side wall of said recess is, as seen in Figure 3, provided with an opening surrounded by a laterally projecting flange 39 which forms a socket at the adjacent side of the locking member, and pressed into said socket is an appropriate lock 40 operated by a key 41. Projecting from the inner end of the lock barrel across the recess 32 is a stem 42, the free end of which is journaled in the adjacent side wall of said recess, and removably fitting the stem is a cam 43 confined between said side wall and a washer 44 abutting the lock 40, the stem being, as brought out in Figure 2, provided with a squared portion to extend through the cam. As will be observed, the lug 36 is curved to rest against the curved rear face of the cam, while the cam is of a length to coact with the upper edge of the head 35 of the pawl 34 for limiting the pawl against upward movement in the recess 32.

Normally, the locking member 22 is disposed near the upper ends of the rails 19 and secured in inactive position by the latch 27 when, as will be seen, the lever 10 may be freely rocked forwardly for releasing the brakes of the vehicle as well as freeing the high speed clutch. However, when it is desired to lock the vehicle, the lever 10 is rocked rearwardly, as shown in the drawings, for applying the emergency brakes as well as locking the high speed clutch inactive, when the knob 30 of the latch 27 is depressed for shifting the head of the latch out of the notch 26. The locking member 22 will then immediately gravitate downwardly along the rails 19 until the ears 25 of said member strike the floor boards 13 when, as shown in the drawings, the ear 24 of the member 22 will be disposed within the slot 12 of the floor boards. As the locking member shifts downwardly on the rails 19, the rack teeth of the pawl 34 will be brought into engagement with the rack teeth 18 of the rack bar 17 so that the pawl will coact with said rack bar for automatically locking the member 22 in lowered active position lying in the angle between the forward edge of the lever 10 and the floor boards for locking the lever against forward movement. Thus, the lever cannot be shifted to release the emergency brakes of the vehicle or free the high speed clutch and, as will be seen, the ear 24 will coact with the said walls of the slot 12 of the floor boards 13 for locking the member 22 against swinging movement around the lever while the ears 25 will coact with the floor boards for preventing possible rocking movement of the locking member. Thus, the locking member cannot be wrenched from active position. However, by inserting the key 41 in the lock 40 and turning said key, the stem 42 of the lock will be rotated for swinging the cam 43 against the lug 36 of the pawl and rocking the pawl inwardly within the recess 32 of the locking member out of engagement with the rack bar 17, when said locking member may be readily lifted upwardly to inactive position. I accordingly provide a particularly efficient device for the purpose set forth and while I have described the device in connection with the emergency brake lever of a Ford automobile, still, as will now be readily understood, the device may, with equal facility, be applied to the appropriate lever of any one of other makes of motor vehicles and I do not, therefore, wish to be limited in this regard.

Having thus described the invention, what I claim is:

1. A locking device including in combination with a lever, a sleeve on the lever, a stationary part adjacent said lever, means slidably mounted upon said sleeve and movable to active position lying between said lever and said part coacting with said part for locking the lever against movement.

2. A locking device including in combination with a lever, a sleeve on the lever, a stationary part adjacent the lever and provided with a slot freely receiving the lever therethrough, means slidably mounted upon the sleeve and movable to active position lying between the lever and said part coacting with said part for locking the lever against movement, said means being provided with a portion extending into said slot for limiting said means against movement with respect to the lever.

3. A locking device of the character described including a sleeve adapted for attachment to a lever, a locking member slidable on said sleeve, and coacting means carried by said member and the sleeve for automatically locking said member against retraction.

4. A locking device of the character described including a sleeve adapted for attachment to a lever, a rack bar carried by the sleeve, a locking member slidably mounted upon the sleeve, and a pawl carried by said member to coact with said rack bar for locking the member against retraction.

5. A locking device of the character described including a rack bar, means for connecting the rack bar with a lever, a locking member slidably supported by said means for movement along the rack bar, a pawl housed in said member to coact with the bar for locking the member against retraction, and a lock operated cam carried by said member to coact with the pawl for shifting the pawl out of engagement with said bar.

6. A locking device of the character described including a sleeve adapted for attachment to a lever, a rack bar carried by the sleeve, rails mounted upon the sleeve, a locking member embracing said rails and the rack bar and slidable upon the rails longitudinally of the rack bar, a latch carried by said member to engage one of the rails for locking said member in inactive position, and a pawl carried by said member to coact with the rack bar for locking the member in active position.

7. The combination with a lever, of a rack bar, means rigidly connecting the rack bar with the lever to extend longitudinally of the lever, a locking member slidably supported by said means, a latch for securing the member in inactive position adjacent one end of the lever, and means for locking said member in active position when shifted toward the other end of the lever.

8. A locking device of the character described including a rack bar, means for connecting the rack bar with a lever, a locking member slidably supported by said means for movement along the rack bar and provided with a recess shaped to define a socket, a pawl fitting at one end in said socket and movable to coact at its opposite end with the rack bar for locking said member against retraction, and a lock operated cam housed in said recess to coact with the pawl for rocking the pawl out of engagement with said rack bar.

In testimony whereof I affix my signature.

JOHN E. McLEOD. [L. S.]